April 7, 1931.  W. G. WILSON  1,800,127

VALVE

Filed Jan. 25, 1926  2 Sheets-Sheet 1

INVENTOR.
Wylie G. Wilson
BY James L. Stewart
ATTORNEYS.

April 7, 1931. W. G. WILSON 1,800,127
VALVE
Filed Jan. 25, 1926 2 Sheets-Sheet 2

INVENTOR.
Wylie G. Wilson,
BY James L. Stewart
ATTORNEYS.

Patented Apr. 7, 1931

1,800,127

UNITED STATES PATENT OFFICE

WYLIE G. WILSON, OF JERSEY CITY, NEW JERSEY, ASSIGNOR TO WILSON RINGS COMPANY, OF JERSEY CITY, NEW JERSEY, A CORPORATION OF NEW JERSEY

VALVE

Application filed January 25, 1926. Serial No. 83,418.

This invention is a valve adapted for general application.

In the valve art, it is of fundamental importance that the seal effected by the valve be a tight seal and that the valve be capable of functioning a great number of times without becoming leaky, i. e., it should be repetitive in character, while retaining its capacity to produce a tight seal. While this desideratum has long been recognized, no construction has been heretofore produced which fully meets the requirements.

Pursuant to the practices of the prior art, valve seals have been formed by bringing a rigid sealing element into engagement with a rigid seat, or by forming one of these elements of material which is permanently deformed or distorted in producing the seal, or by interposing a gasket, composed of permanently deformable material, intermediate the sealing element and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as a result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relative short period.

Another object of the invention is to so constitute the sealing element or elements and so operate them, that they may be constructed economically and without that refined workmanship which is usually incident to the grinding of valves and valve seats so that they will cooperate perfectly. The present structures are such that, even though in their primary manufacture they may not be axially co-incident with relation to each other or of truly complementary shape, yet in the operation of the valve, they will adjust themselves to such irregularities and compensate for the same by reason of the material from which they are manufactured and the particular form employed in this connection.

Speaking generally, the valve of this invention embodies a sealing element in the form of a hollow cone or frustrum of a hollow cone, and I have discovered that these forms will function with remarkable efficiency in the formation of a tight repetitive seal, when constituted from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate," such as leather, asbestos, soft rubber, soft metals, etc.

As previously stated, the valve of this invention embodies a sealing element in the form of a hollow cone or frustum of a hollow cone, and it contemplates that such cone or frustum of a cone shall be formed of what is characterized as "obdurate material". It is also contemplated that said obdurate material shall be employed in such mass or thickness in relation to its length between supports or abutments as to present a resistance to axial compression which shall be sufficiently pronounced to present to any power that may be utilized to compress the same axially a resistance which shall be such as to make it impossible or impractical to compress the same beyond its elastic limit by the means employed to exercise axial compression on the said conical form.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have discovered that when an unbroken hollow cone of obdurate material is compressed axially, its outer periphery expands, substantially, in a circle; that is, the expansion is uniform all around when meeting with uniform resistance all around, and, accordingly, its periphery may be utilized to form a fluid tight seal with a suitable seat.

Similarly, if an element of hollow frusto-conical section is placed under axial compression, which tends to flatten it, the outer periphery of the frusto conical section will tend to expand cross axially and its inner periphery will tend to cross axially contract to bring both of said peripheries into engagement with suitable cooperating seats or abutments for the purpose of producing a tight seal.

"Unbroken", as used above, may be defined as peripherally continuous; i. e., not slotted or formed into fingers.

By a "hollow cone", I mean a cone which is hollowed out to provide a conical shell.

By a "hollow frusto conical section", I mean a frusto conical section which is hollowed out to provide a frusto conical shell.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the sealing element or elements must be within the elastic limit thereof; otherwise, said element would not tend to resume (i. e., tend to spring back to) its normal unsealing form. Only an element in the sense of this invetnion composed of obdurate material and of substantially hollow conical or frusto conical configuration will thus properly function.

The term "elastic limit" as employed in the specification and claims of this application is so employed to designate that quality or characteristic of the conical forms of obdurate material employed which, when compressed within predetermined limits and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of the hollow conical and frusto conical forms of this invention, it is suggested that they function like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, becomes less and less.

The sealing element of the present invention may be considered as functioning like a multiplicity of toggles; that is to say, there is a toggle-like action in each diametric plane, and, obviously, there is an infinite number of toggles. When the sealing or locking element is compressed axially, the dimensions of such element and the proportioning of the obdurate material of which it is composed, bring about, within the element, the steadily increasing functional characteristics incidental to toggle action. This action results in a cross axial or radial movement of the sealing element until its periphery or peripheries are forced into tight sealing engagement with cooperating seats. The obdurate element is so dimensioned and proportioned that the seal is effected, in the manner described, before the elastic limit of the element is reached. Accordingly, upon release of the stresses incident to producing the seal, the element tends to autogenously, i. e., automatically, break the seal.

It therefore follows that, in a valve embodying this invention, the seal is effected by stressing a sealing element of obdurate material within its elastic limits and that the seal is maintained as long as the element is thus stressed. However, when these stresses are relieved the seal is broken.

A further feature of this invention resides in making the seat of the conical sealing element of such conformation that a sealing edge contact is provided at the outer peripheral edge of the sealing element, and the seat is formed with a gradually decreasing cross-section in the direction of the sealing movement.

After many repetitions of the sealing operation, the seat may become worn by reason of the line contact of the sealing element, in which event a sealing element of the same construction but of different base diameter may be substituted so as to make another and different line contact with said conical seat, or another conical seat may replace the one so affected.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as limiting.

Figure 1:
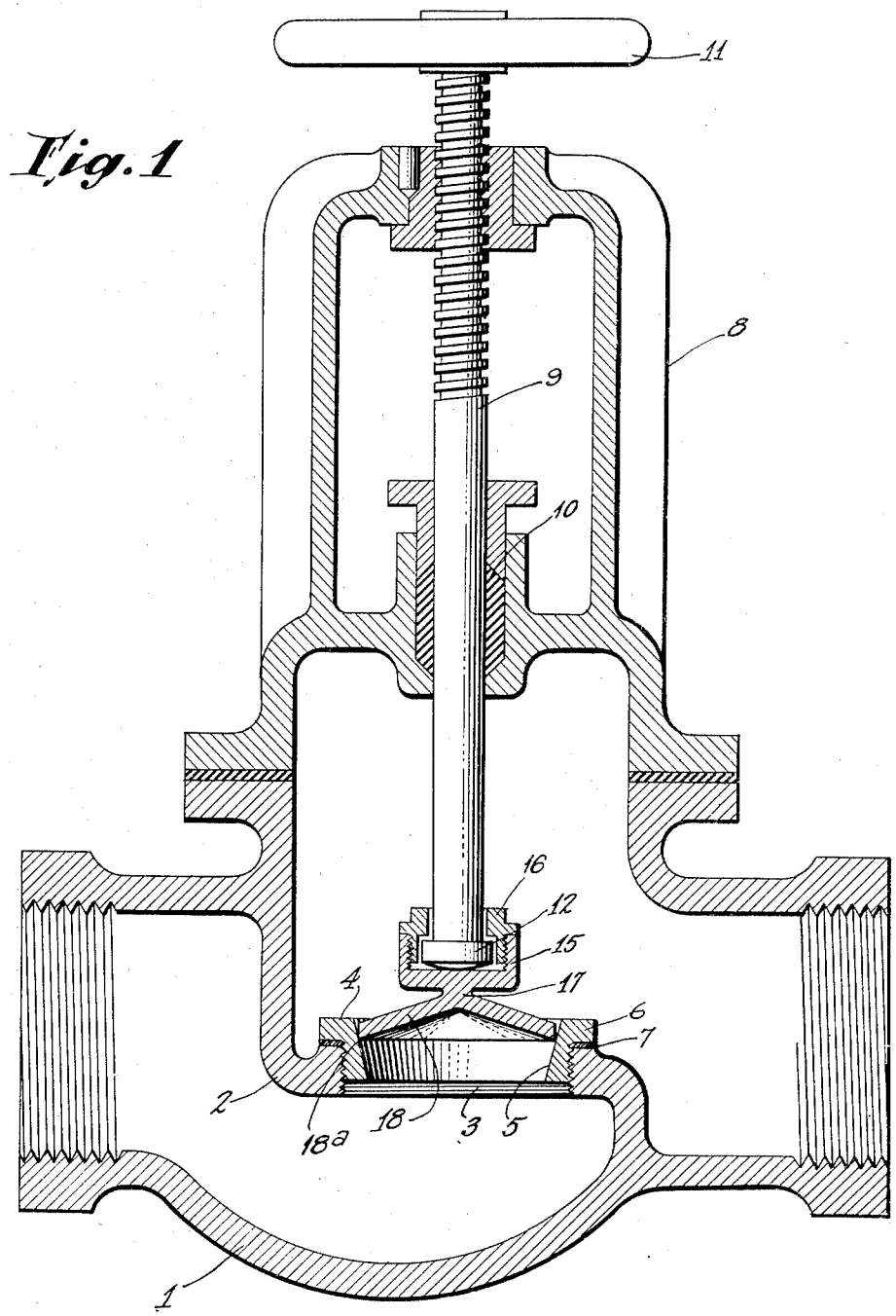
Figure 1 is a section through a valve embodying the seal of the present invention, showing the parts in sealed relation.
Figure 2:
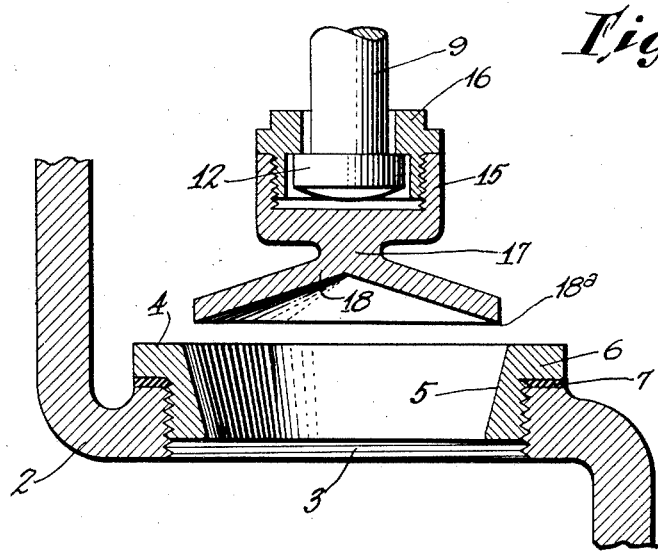
Figure 2 is a fragmentary corresponding section, showing the seal in the partly raised and open position.
Figure 3:
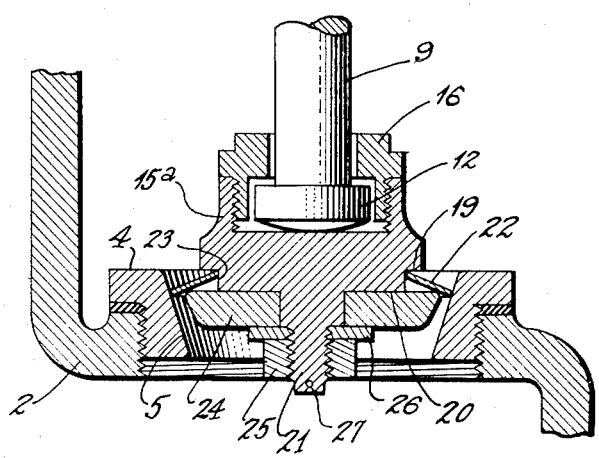
Figure 3 is a section through another form of the valve.

Referring first to Figures 1 and 2 of the drawings, 1 designates a valve casing having a partition or diaphragm 2 in which is formed a port opening 3. The opening 3 is threaded to receive a complementarily threaded seat ring 4, through which there is a coaxial passage, the wall 5 of which constitutes the valve seat. This seat may be of various shapes, but is preferably tapered or frusto conical as clearly shown in the drawings. It will be noted that the seat ring is provided with a radially extending flange 6 which bears upon a gasket 7 for the purpose of forming a tight joint with the diaphragm of the valve.

The valve casing is provided with a suitable bonnet 8 through which is threaded a valve stem 9, a gland 10 serving to preclude leakage. To the upper end of the valve stem is secured a suitable hand wheel 11, while at the lower end of such stem an enlargement 12 is formed. The enlargement projects into a pocket in the spindle 15 of the valve and is held in place therein by means of the locking ring 16 which has threaded engagement with the spindle.

Carried by the spindle 15 and joined thereto by an intermediate neck 17 of reduced cross section is the sealing element 18 of the valve.

The sealing element 18 is of obdurate material and is of hollow conical configuration. It is of a diameter adapting it to enter, but not pass through the passage in the seat ring, so that by the manipulating of the hand wheel, the sealing element may be moved from the unsealing position of Figure 2 to the sealing position of Figure 1 and vice versa. As previously stated, the sealing element 18 may be formed with a peripheral surface parallel with the seat 5, but a preferred form of construction is to form such surface at an angle to the surface of the seat 5, thus producing a line contact between the sealing element and its seat as illustrated.

I have found, as previously stated, that if a hollow conical structure of obdurate material is brought into engagement with a resisting seat, axial pressure applied to said element will decrease its altitude and correspondingly expand its periphery. It therefore follows that if the sealing element is lowered from the position of Figure 2 into the position of Figure 1, to bring its outer periphery into engagement with the seat 5, the application of axial force to said element will cause the periphery thereof to tightly engage said seat. Thus, when the valve stem is screwed down, the seat forms an abutment acting to preclude downward movement of the sealing element, so that when pressure is applied through the valve stem, the sealing element will be compressed axially to expand its periphery to form a tight seal with the seat 5. Being of hollow conical construction and of obdurate material, this operation will stress the sealing element and as long as the pressure of the stem is maintained, these stresses will continue and the seal will remain tight. If, however, the stem is rotated in a retrograde direction to relieve the stresses referred to, the sealing element will, because of its obduracy, return or tend to return to its normal unsealing form, and in so doing will break the seal autogenously, i. e., of itself, as soon as the pressure of the stem is relieved.

It is of marked practical importance that the seal is effected, while stressing the sealing element within its elastic limits, so that the tendency of the sealing element to resume or spring back towards its original form, when pressure is relieved, is substantially unimpaired from a practical standpoint.

I have found, as a result of exhaustive experimentation, that, by the employment of a hollow conical element of obdurate material, a repetitive seal is produced without requiring the usual grinding operations heretofore considered essential in the making of valves and valve seats. This result is secured by machining the sealing element and the seat as is usual in the art without the grinding heretofore deemed essential.

In accordance with this invention, a tight seal results from the coordinating action of the outer periphery of the sealing element and the surface of the seat, due to the outward spreading or expansion of the sealing element as hereinbefore described.

Practice has further demonstrated that even though the seat or the sealing element be slightly out of round, a tight seal may nevertheless be effected by the construction of this invention.

The tendency of the conical or frusto conical sealing elements of obdurate material to autogenously return or tend to return to their original forms after compression is of primary importance. As previously stated, such retraction does not necessarily involve a return of the sealing element to exactly the same form, but to approximately that same form when considered from a practical standpoint. Such a tendency to return or spring back specifies the practical requirements of the present invention. The resilient quality of the obdurate material from which the hollow conical or frusto conical element is made lends itself to repeated action and reaction through an extended period of operation.

The foregoing detailed description sets forth the invention in its preferred practical forms and the invention is to be understood as fully commensurate with the appended claims.

In the claims, the expression "conical section" is to be given a sufficiently broad interpretation to include all of the forms of the invention herein referred to.

Having thus fully described the invention, what I claim as new and desire to secure by Letters Patent is:

1. In a valve, a valve casing, and a conical seat within said casing, in combination with a sealing element comprising a hollow conical section of metal bendable but not easily deformed and resilient under axial compression and relief from such compression, said sealing element having a cylindrical peripheral edge coaxial with the sealing element, whereby the sealing element is adapted to engage with the conical seat in a line contact, and operating means for axially moving the sealing element into and out of engagement with the seat and for axially compressing the sealing element while in engagement with the seat.

2. In a valve, a valve casing, and a conical seat detachably secured within said casing and adapted to be removed from the casing for resurfacing, in combination with a sealing element comprising a hollow conical section of metal bendable but not easily deformed and resilient under axial compression and relief from such compression, said sealing element having a cylindrical peripheral edge coaxial with the sealing element, whereby the sealing element is adapted to engage with the conical seat in a line contact, and operating means for axially moving the sealing element into and out of engagement with the seat and for axially compressing the sealing element while in engagement with the seat, said sealing element being removably secured to the operating means.

3. In a valve, a valve casing, and a conical seat within said casing, in combination with a sealing element comprising a hollow conical section of metal bendable but not easily deformed and resilient under axial compression and relief from such compression, said sealing element having a cylindrical peripheral edge coaxial with the sealing element, whereby the sealing element is adapted to engage with the conical seat in a line contact, and operating means for axially moving the sealing element into and out of engagement with the seat and for axially compressing the sealing element while in engagement with the seat, said sealing element being removably secured to the operating means.

4. In a valve, a valve casing, and a conical seat within said casing in combination with a sealing element comprising a hollow conical section of metal bendable but not easily deformed and resilient under axial compression and relief from such compression, said sealing element having a cylindrical peripheral edge co-axial with the sealing element whereby the sealing element is adapted to engage with the conical seat in a line contact, said sealing element being provided with a central aperture having a cylindrical wall co-axial with the sealing element, and operating means, including in part a stem fitting within said aperture, for axially moving the sealing element into and out of engagement with the seat and for axially compressing the sealing element while in engagement with the seat, an edge of said aperture wall making a sealing grip with said stem when the element is axially compressed, said sealing element being removably secured to the operating means.

Signed by me at Jersey City, N. J., this 29 day of December, 1925.

WYLIE G. WILSON.